Figure 1:
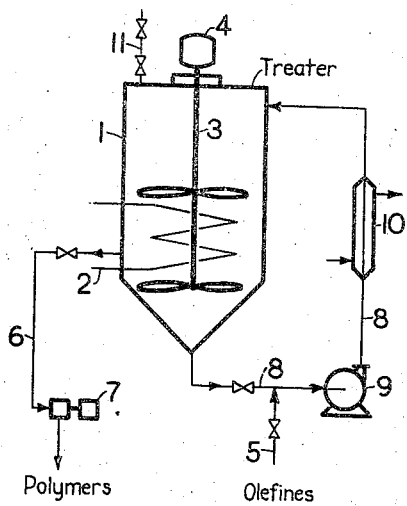

Aug. 1, 1939.  J. N. J. PERQUIN ET AL  2,168,271
PROCESS FOR THE POLYMERIZATION OF UNSATURATED COMPOUNDS
Filed Sept. 21, 1937

Inventors:
Johannes Nicolaas Jacobus Perquin
Hendrikus Stokman
By their Attorney

UNITED STATES PATENT OFFICE 2,168,271

PROCESS FOR THE POLYMERIZATION OF UNSATURATED COMPOUNDS

Johannes Nicolaas Jacobus Perquin, Rotterdam, and Hendrikus Stokman, Amsterdam, Netherlands, assignors to Shell Development Company, San Francisco, Calif., a corporation of Delaware Application September 21, 1937, Serial No. 164,832
In the Netherlands September 26, 1936

7 Claims. (Cl. 196—78)

This process relates to an improved method for the polymerization of unsaturated compounds in the liquid state with active polymerization catalysts, and in particular deals with the production of viscous oils from normally liquid olefines with metal halide catalysts such as aluminum chloride.

It is the purpose of this invention to carry out polymerization with the active catalysts in the liquid state in such a manner as to maintain during the reaction the optimum temperature for the polymerization, so that the progress of the reaction is not materially disturbed by the evolved heat of polymerization.

Temperature is often very difficult to control in the polymerization of olefines with halide catalysts, evolution of heat taking place when the catalyst and the reactive substance are brought together. At the same time most of these polymerizations are quite sensitive toward variations in the temperature, different types of products being produced at different temperatures, so that very accurate temperature control is essential for the manufacture of uniform products.

It has been attempted to overcome this difficulty by feeding the catalyst into the reagent continuously and slowly so that at no time local overheating would cause a rise of the temperature above a permissible maximum. But it was found that it is very difficult to maintain a slow continuous accurately measured feed of active metal halide catalysts. In fact, when adding, for example, aluminum chloride to heated volatile olefines or hydrocarbon material containing such olefines, e. g. cracked distillate, the aluminum chloride coming into contact with the hydrocarbon vapours forms a sticky mass, which cannot be accurately measured. Moreover, in view of the superatmospheric pressure generated in the polymerizing vessel by the warm olefinic material the catalyst is to be introduced under pressure, which gives rise to difficulties. It also was tried to suspend the catalyst in inert liquids such as saturated hydrocarbon liquids and to feed the suspended catalyst in the form of a slurry. However, this has the disadvantage of requiring the separation of the inert hydrocarbon material from the products of polymerization, and moreover the catalyst in the suspension tends to settle out, so that there is danger of feeding the active ingredients in the slurry unevenly.

We have invented a method for contacting the reactive material and the active catalyst, which permits easy control of the temperature, and which at the same time does not require the continuous feeding of the catalyst. While our method is particularly useful in connection with batch polymerization, it can be modified to operate continuously. It consists essentially of dispersing fresh catalyst in a portion of a fully polymerized mixture of treating material, spent catalyst and sludge, and slowly introducing into the resulting dispersion the reactive material. The sludge apparently aids materially in dispersing the fresh catalyst, thereby not only stabilizing the suspension, but also minimizing the danger of local overheating, the heat being liberated uniformly and slowly, so that it can readily be dissipated and carried away by ordinary indirect cooling means. The reactive substance should preferably be fluid, i. e., it may be liquid or gaseous, or if solid it may be introduced in the form of a suitable solution, and the reaction product must be liquid. By applying our method, either carried out batchwise or continuously, the aforementioned drawbacks are obviated owing to the fact that the catalyst is added to the less volatile and saturated polymerized mixture.

Our method will be fully understood from the attached schematic drawing, which illustrates two possible forms of apparatus suitable for our purpose, one for batch and the other for continuous operation. Referring to Figure 1 which shows an apparatus particularly adapted for batch operation, treater 1 is equipped with cooling coil 2, stirrer 3 driven by a suitable prime mover, such as an electric motor 4, valved drawoff line 6 provided with pump 7, centrifugal pump 9, in a recirculating line 8, part of which is surrounded by a cooling jacket 10 and which connects the bottom of the treater 1 with its upper part, valved inlet pipe 5 for liquid treating stock connected to line 8 on the suction side of pump 9, and valved apparatus 11 for supplying the active catalyst, conveniently mounted on top of the treater 1.

Operation is as follows: After polymerization of a batch has been completed, a portion of polymerized product with suspended sludge comprising the spent catalyst is drawn off through line 6 and pumped by means of pump 7 to a settler, not shown, for the separation of the sludge. The remaining portion of the product with suspended sludge, instead of being withdrawn, is recirculated by pump 9 in line 8 to the top of the treater. During this recirculation an amount of solid catalyst, such as a halide catalyst of the type of aluminum chloride, required for the next following polymerization, is introduced from the catalyst feeding apparatus 11 into the treater 1, wherein a reduced pressure prevails owing to the aforesaid removal of a portion of polymerized product with suspended sludge, which reduced pressure facilitates the introduction of the fresh catalyst. A suspension of fresh catalyst in a portion of the polymer from the preceding batch is thus produced.

When a sufficient amount of fresh catalyst has been charged to the treater, fresh treating stock, such as a cracked distillate, is admitted through line 5 into the circulating liquid dispersion of catalyst in the polymer at a relatively slow rate, so that the temperature of the mixture in the treater which is continuously being agitated by means of circulation pump 9 or stirrer 3, or both, never rises above a certain pre-determined maximum. The admission of the cracked distillate may begin after the entire amount of catalyst necessary for the following batch, or only a portion thereof, has been suspended in the polymer as described. In the latter case the remaining portion of catalyst may be introduced later in a single dump, or if desired continuously or intermittently in several dumps at convenient time intervals, while the flow of cracked distillate may be stopped temporarily. We have found that variations in the reaction temperature should at no time exceed about 5° C. of a pre-determined temperature, in order to obtain uniform products, and the rate of flow of the cracked distillate must be controlled accordingly. The maximum permissible rate of feeding the distillate to maintain this uniformity of temperature depends on a variety of factors such as the concentration of active catalyst in the dispersion, activity of the catalyst itself, rate of circulation of the dispersion and to some extent its total amount circulated, and effectiveness of the cooling means. We have found, for instance when polymerizing with anhydrous aluminum chloride a distillate boiling between about 50° to 280° C. obtained by vapor phase cracking of paraffin wax, the rate of feed of the distillate should not be more than about 1/5, and preferably be less than 1/10, of the rate of circulating the catalyst dispersion containing about 20% of fresh aluminum chloride. As the catalyst is being spent the rate of feeding the distillate may be increased gradually, but is preferably kept at all times below 1/2 of the circulation rate of the catalyst dispersion.

When the required amounts of catalyst and cracked distillate have finally been admitted into the treating vessel, agitation is continued for the time necessary to complete the polymerization to the desired point.

The cooling coil is operated so as to maintain throughout the reaction period a predetermined optimum temperature. This means that during the early stages of the polymerization, cooling must be relatively intense, but later may be discontinued altogether. Since at no time during the reaction concentrated fresh catalyst comes in contact with a large mass of very reactive cracked distillate, there are no sudden fluctuations in the temperatures, and it is possible to maintain the required even temperature throughout by means of ordinary cooling coils, jackets and the like.

The method of introducing the entire amount of the catalyst required for a batch into the treater before admitting cracked distillate has the disadvantage of contacting during the early stages of the treatment the distillate with a relatively large amount of fresh active catalyst, whereas during the later stages partly spent catalyst only is available for the portions of the distillate introduced later. While we have found that this disadvantage is of minor importance and far less serious than the fluctuations in temperature which heretofore were considered unavoidable, it is often preferable to start the polymerization with a portion only of the catalyst suspended in the oil at the beginning of a cycle and then adding the remaining portion of the catalyst while the cracked distillate is being slowly introduced, as hereinbefore described. In this manner we combine all the advantages of positive temperature control, absence of local temperature fluctuations and uniform contact of fresh catalyst and cracked distillate.

We have found that as the result of contacting fresh stock with catalyst suspended in sludge-containing polymer the smoothness of operation is so great that it is possible to complete the mixing of given amounts of fresh catalyst and distillate in a small fraction of the time which is ordinarily required when gradually adding fresh catalyst to a batch of cracked distillate. Due to this factor considerable time is saved and the treating capacity of the treating equipment is increased in proportion.

A further advantage of our method is that it is somewhat easier to maintain a superatmospheric pressure on the treater during polymerization, which enables a reduction of losses of cracked distillate by vaporization. Due to the difficulty of feeding small, accurately measured doses of solid catalyst against superatmospheric pressure, such pressures were deliberately avoided in the older methods and consequently vaporization losses frequently were high.

The size of the polymer portion which is retained in the treater from one batch to the next, varies somewhat depending upon the reactivities of both the catalyst and the cracked distillate. When using aluminum chloride and a distillate produced by vapor phase cracking of wax suitable for the production of high viscosity index lubricating oils, we have found it convenient to retain about 10 to 25% of the charge. The concentration of fresh catalyst in the dispersion varies between about 5 to 35% and preferably between 15 and 25%, and the amount of aluminum chloride used is usually 1½ to 8% of the weight of the distillate.

The sludge formed during the polymerization is not allowed to settle out in the treater, but is kept suspended in the polymer, suspended sludge being withdrawn together with the polymer and allowed to settle in a separate settling vessel of suitable design, or, if desired, being removed centrifugally. In this manner we avoid tying up the treating vessel for settling purposes. The sludge contained in the retained portion has no bad effect on the freshly admitted cracked distillate and on the contrary, aids in the dispersion of fresh catalyst as pointed out before and furthermore may save a small amount of fresh catalyst, since the spent catalyst in the sludge usually has a slight polymerization power for fresh cracked distillate.

Figure 2:
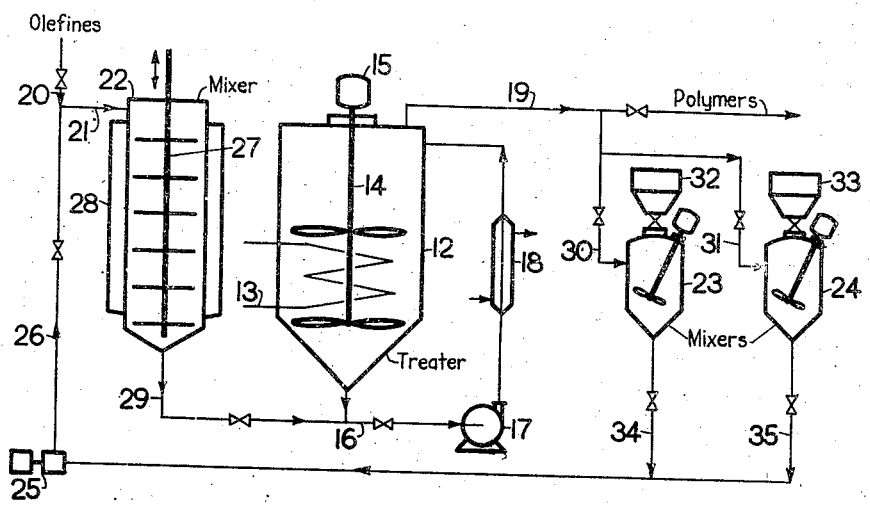

Figure 2 represents an apparatus suitable for the continuous operation of our method. Treater 12 is equipped with cooling coil 13, stirrer 14 operated by prime mover 15, recirculation line 16, comprising a centrifugal pump 17 and partly surrounded by cooling jacket 18 and draw-off line 19 at the top of the treater. In operation fresh cracked distillate is continuously introduced through line 20 from a source not shown and via line 21 into mixer 22, together with a suspension of fresh catalyst in a portion of the fully reacted polymer withdrawn through line 19, which suspension is prepared in mixing-tank 23 or 24 and is pumped by means of pump 25 via line 26 and line 21 into mixer 22. This mixer is equipped with a mixing device 27, consisting of a vertical shaft provided with a plurality of perforated plates and connected to a mechanism for imparting a vertical reciprocating motion to said plates, and further with a cooling-jacket 28, through which cooling water is circulated whereby heat of polymerization is carried away as fast as it develops. In this mixer an intimate mixture of cracked distillate and catalyst suspension is obtained, which mixture is continuously withdrawn through line 29 and introduced via recirculation line 16 into the treater 12. In this treater sufficient time is provided to complete the polymerization of the cracked distillate. Cooling at this stage by means of cooling-jacket 18 or coil 13 or both is frequently unnecessary, since most of the heat of polymerization is generally liberated in the mixer 22. The fully reacted polymer is then withdrawn through line 19, a portion being diverted through lines 30 or 31 to one of two mixing-tanks 23 or 24. A measured amount of aluminum chloride is admitted in one or several dumps from catalyst storing-vessels 32 or 33 to the mixing-tank 23 or 24 which is being filled, while from the other of the two tanks a liquid dispersion of fresh aluminum chloride in sludge-containing polymer is conveyed through lines 34 or 35, and is introduced by pump 25 in line 26 into line 21 and mixer 22.

Since in this mode of operation the concentration and activity of the catalyst remains substantially constant, the maximum permissible rate of feed of the distillate is also constant.

The cracked distillate, prior to being admitted to the treater, may be pre-treated in any suitable manner, if desired, to eliminate polyolefines or other highly reactive compounds which tend to form excessive amounts of sludge. Methods for such pretreatments are well-known in the art of polymerization.

While we have described in the foregoing an apparatus of certain design, it shall be understood that we do not wish to be limited to the particular features shown, but that known equivalents of the various pieces of equipment shown shall be included. For instance, instead of using a cooling-coil 2, we may jacket the treater, or we may use both a coil and a jacket.

Furthermore, while we have mentioned olefines only as compounds suitable for polymerization, other polymerizable substances, such as the vinyl esters and ethers, vinyl chloride, mono- and dichlor butadiene, chloroprene, acroleine, crotonaldehyde, drying or semi-drying fatty oils, their mixtures with non-drying or mineral oils, etc., may be polymerized advantageously by our method, provided the polymerization product remains in a liquid state, either because the polymer itself is liquid or because a sufficient amount of a solvent for the polymer is present.

Our process is applicable to any catalyst which is capable of polymerizing the particular fluid substance under treatment. The greatest advantages are derived where normally the rate of polymerization is relatively high, so that control of the temperature is difficult. Therefore, the process is particularly useful in connection with very powerful active metal halide catalysts, such as aluminum chloride, zinc chloride, iron chloride, chromium chloride, tin chloride, titanium chloride, beryllium chloride etc. However, under many circumstances polymerizations with weaker catalysts, such as sodium or barium peroxides, bleaching clays, bauxite, solid catalysts, produced by calcining silica and phosphoric acid, anhydrous phosphoric acid, phosphorus pentoxide, sodium bisulfate, zinc sulfate, aluminum sulfate, double salts and organic complexes of aluminum chloride, etc. are benefited by our method.

The following is a typical example of the mode of operation of our process. Into an agitator, arranged in the manner described in the Figure 1, having a capacity of about 4,000 liters and containing approximately 500 liters of a liquid reaction mixture retained from a polymerization in which cracked distillate, produced by vapor phase cracking a wax cake containing 68% paraffin wax, was polymerized with aluminum chloride, 40 kg. of fresh aluminum chloride were introduced while circulating the contents of the agitator. The temperature of the resulting suspension was adjusted to 100° C. Approximately 2000 kgs. of said cracked distillate were pre-heated to 82° C. and were pumped over a period of about 1 hour into the agitator, the rate of pumping being so regulated to maintain in the agitator a temperature of 100° C. ±3° C. During the period of pumping cooling water was circulated through the cooling coil. When all the distillate had been introduced the mixture was kept agitated and soon the cooling water could be shut off. After several hours of agitation the bromine number of the reaction mass had dropped to 1.6 and polymerization was completed.

The mixture was then drawn off, except for about 500 liters thereof which were retained and were used to polymerize the next batch in the manner described above. Three successive batches were thus polymerized and a total of 6309 kgs. cracked distillate and 115 kgs. aluminum chloride had been charged to the treater. From this, after settling of the sludge, 5917 kgs. of an upper layer were obtained, which after distillation of unreacted distillate yielded 3175 kgs. of a lubricating oil having a viscosity of 15.5 Engler degrees at 50° C. and a viscosity index of 109.

We claim as our invention:

1. In the process of polymerizing olefines with an active metal halide catalyst the steps of dispersing a quantity of the fresh catalyst in a sufficient volume of fully polymerized liquid olefines containing used catalyst and having a polymerization temperature to form a liquid substantially uniform catalyst dispersion, thereafter mixing said catalyst dispersion with olefines under polymerizing conditions, maintaining the resulting olefine-containing catalyst dispersion by cooling at the said polymerization temperature for a sufficient time to complete the polymerization of olefines whereby the catalyst is spent, withdrawing a portion of polymerized product containing spent catalyst from the process and employing the remaining portion containing residual spent catalyst as a dispersing medium for the fresh catalyst.

2. In the batch process of polymerizing olefines with an active metal halide catalyst the steps of dispersing a quantity of fresh catalyst in a sufficient volume of fully polymerized liquid olefines containing used catalyst produced in a preceding batch to form a liquid substantially uniform catalyst dispersion, maintaining same as a liquid pool at a polymerization temperature, gradually incorporating into it a limited quantity of olefines while preventing by cooling a substantial temperature change of the mixture, discontinuing the addition of olefines and maintaining the olefine-containing mixture undergoing polymerization at the polymerization temperature for a time sufficient to complete polymerization of the olefines whereby the catalyst is spent, withdrawing a portion of the polymerized product containing spent catalyst from the process and employing the remaining portion containing residual spent catalyst as a dispersing medium for the fresh catalyst in the next batch treatment.

3. In the batch process of polymerizing olefines with an active metal halide catalyst the steps of dispersing a quantity of fresh catalyst in a sufficient volume of fully polymerized liquid olefines containing used catalyst produced in the preceding batch to form a liquid substantially uniform catalyst dispersion, maintaining same as a liquid pool at a polymerization temperature, circulating a stream thereof from and to the said pool, gradually incorporating into said stream a limited quantity of olefines, while preventing by cooling a substantial temperature change of the mixture, discontinuing the addition of olefines and continuing the circulation of the olefine-containing mixture while maintaining same at the polymerization temperature for a time sufficient to complete polymerization of the olefines whereby the catalyst is spent, withdrawing a portion of the polymerized product containing spent catalyst from the process and employing the remaining portion containing residual spent catalyst as a dispersing medium for the fresh catalyst in the next batch treatment.

4. In the batch process of polymerizing a vapor phase cracked hydrocarbon distillate with active aluminum chloride to produce lubricating oil the steps of dispersing a quantity of fresh aluminum chloride in a sufficient volume of liquid fully polymerized olefines containing spent aluminum chloride from a preceding batch to form a liquid substantially uniform aluminum chloride dispersion, maintaining same as a liquid pool at a polymerization temperature suitable for the production of lubricating oil, gradually incorporating into it a limited quantity of said distillate, while preventing by cooling a substantial temperature change of the mixture, discontinuing the addition of distillate and maintaining the mixture undergoing polymerization at the polymerization temperature for a time sufficient to complete the polymerization to lubricating oil, whereby the catalyst is spent withdrawing a portion of the polymerized product containing spent catalyst from the process and employing the remaining portion containing residual spent aluminum chloride as a dispersing medium for the fresh catalyst in the next batch treatment.

5. In the batch process of polymerizing a vapor phase cracked hydrocarbon distillate with active aluminum chloride to produce lubricating oil the steps of dispersing a quantity of fresh aluminum chloride in a sufficient volume of liquid fully polymerized olefines containing spent aluminum chloride from a preceding batch to form a substantially uniform dispersion containing between 5 and 35% fresh aluminum chloride, maintaining said dispersion as a liquid pool at a polymerization temperature suitable for the production of lubricating oils, gradually incorporating into it a limited quantity of said distillate, while preventing by cooling a substantial temperature change of the mixture, discontinuing the addition of distillate and maintaining the mixture undergoing polymerization at the polymerization temperature for a time sufficient to complete the polymerization to lubricating oil, whereby the catalyst is spent withdrawing between 75 and 90% of the polymerized product containing spent catalyst and employing the remainder containing residual spent aluminum chloride as a dispersing medium for the fresh catalyst in the next batch treatment.

6. In the batch process of polymerizing a vapor phase cracked hydrocarbon distillate with active aluminum chloride to produce lubricating oil the steps of dispersing a quantity of fresh aluminum chloride in a sufficient volume of liquid fully polymerized olefines containing spent aluminum chloride from a preceding batch to form a substantially uniform dispersion containing between 15 and 25% fresh aluminum chloride, maintaining same as a liquid pool at a polymerization temperature suitable for the production of lubricating oils, circulating a stream thereof from and to said pool, incorporating into said stream a limited quantity of said distillate at an initial rate not to exceed a ratio of 1:5 of fresh distillate to said dispersion in the resulting mixed stream, while preventing by cooling a substantial temperature change of the mixture, discontinuing the addition of distillate and maintaining the mixture undergoing polymerization at the polymerization temperature for a time sufficient to complete the polymerization to lubricating oil, whereby the catalyst is spent withdrawing between 75 and 90% of the polymerized product containing spent catalyst and employing the remainder containing residual spent aluminum chloride as a dispersing medium for the fresh catalyst in the next batch treatment.

7. In the batch process of polymerizing a vapor phase cracked hydrocarbon distillate with active aluminum chloride to produce lubricating oil the steps of dispersing a quantity of fresh aluminum chloride in a sufficient volume of fully polymerized product containing spent aluminum chloride from a preceding batch to form a substantially uniform dispersion containing between 15 and 25% fresh aluminum chloride, maintaining same as a liquid pool at a polymerization temperature suitable for the production of lubricating oils, circulating a stream thereof from and to said pool, incorporating into said stream a limited quantity of said distillate at a gradually increasing rate not to exceed a ratio of 1:2 of fresh distillate to said dispersion in the resulting mixed streams, while preventing by cooling a substantial temperature change of the mixture, discontinuing the addition of distillate and maintaining the mixture undergoing polymerization at the polymerization temperature for a time sufficient to complete the polymerization to lubricating oil, whereby the catalyst is spent withdrawing between 75 and 90% of the polymerized product containing spent catalyst and employing the remainder containing residual spent catalyst as a dispersing medium for the fresh catalyst in the next batch treatment.

JOHANNES NICOLAAS JACOBUS PERQUIN.
HENDRIKUS STOKMAN.